(12) United States Patent
Otoshi

(10) Patent No.: US 12,484,879 B2
(45) Date of Patent: Dec. 2, 2025

(54) ULTRASOUND DIAGNOSTIC APPARATUS

(71) Applicant: FUJIFILM Healthcare Corporation, Chiba (JP)

(72) Inventor: Masakazu Otoshi, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/660,221

(22) Filed: May 9, 2024

(65) Prior Publication Data

US 2024/0398376 A1 Dec. 5, 2024

(30) Foreign Application Priority Data

May 29, 2023 (JP) .................. 2023-087757

(51) Int. Cl.
*A61B 8/00* (2006.01)
*A61B 50/20* (2016.01)

(52) U.S. Cl.
CPC ................ *A61B 8/44* (2013.01); *A61B 50/20* (2016.02)

(58) Field of Classification Search
CPC ........... A61B 50/20; A61B 50/22; A61B 8/44; A61B 8/4433; A61B 8/4444; A61B 8/4405; F16B 45/02; F16B 45/022; F16B 45/024; F16B 45/026; F16B 45/027; F16B 45/028; F16B 45/036; F16C 11/00; F16C 11/04; F16L 3/00–13
See application file for complete search history.

(56) References Cited

U.S. PATENT DOCUMENTS

| 4,564,163 A * | 1/1986 | Barnett | H02G 3/32 |
| | | | 24/297 |
| 2024/0022056 A1* | 1/2024 | Nunez | H02G 3/32 |
| 2024/0285364 A1* | 8/2024 | Chihara | A61B 8/4427 |

FOREIGN PATENT DOCUMENTS

| JP | 2011139722 | 7/2011 |
| JP | 2012143330 | 8/2012 |
| JP | 2017192532 | 10/2017 |

* cited by examiner

*Primary Examiner* — Carolyn A Pehlke
(74) *Attorney, Agent, or Firm* — JCIPRNET

(57) ABSTRACT

An ultrasound diagnostic apparatus includes: an attachment surface which is an outer surface of the ultrasound diagnostic apparatus; and a cable hook attached to the attachment surface, in which the cable hook has a movable arm configured to be switchable between a closed posture and an open posture, and the movable arm forms a pass-through path through which a probe cable is insertable and which has a substantially closed contour in a space with the attachment surface in the closed posture, and a part of the contour is interrupted and the pass-through path is opened in the open posture.

8 Claims, 9 Drawing Sheets

ULTRASOUND DIAGNOSTIC APPARATUS

CROSS-REFERENCE TO RELATED APPLICATION

This application claims the priority benefit of Japan application serial no. 2023-087757, filed on May 29, 2023. The entirety of the above-mentioned patent application is hereby incorporated by reference herein and made a part of this specification.

BACKGROUND

1. Technical Field

The present disclosure relates to an ultrasound diagnostic apparatus including a cable hook.

2. Description of the Related Art

In the related art, an ultrasound diagnostic apparatus that transmits and receives ultrasonic waves to and from a subject (for example, a living body) and forms an ultrasound image such as a tomographic image based on a reception signal obtained by the transmission and reception of the ultrasonic waves is widely known. An ultrasound probe is connected to the ultrasound diagnostic apparatus via a probe cable. In general, the probe cable has a certain length such that the ultrasound probe can be used even at a place distant from the ultrasound diagnostic apparatus. Therefore, unless special measures are taken, a part of the probe cable often hangs down to a floor surface.

Therefore, in the related art, it has been proposed to provide the ultrasound diagnostic apparatus with a cable hook for hooking and holding the probe cable. For example, JP2011-139722A, JP2012-143330A, and JP2017-192532A disclose an ultrasound diagnostic apparatus having such a cable hook.

SUMMARY OF THE INVENTION

Here, in all cable hooks in the related art, a hook portion is open upward. In the related art, the probe cable is placed on the hook portion from above and hooked thereon. In such a configuration, the hooked probe cable is detached from the hook portion against the user's will. In addition, in the configuration of the related art, an unintended probe cable may slip into the hook portion, causing the probe cable to become entangled.

Therefore, the present disclosure is directed to an ultrasound diagnostic apparatus that can hold a probe cable more appropriately.

An ultrasound diagnostic apparatus of the present disclosure comprises: an attachment surface which is an outer surface of the ultrasound diagnostic apparatus; and a cable hook attached to the attachment surface, in which the cable hook has a movable arm configured to be switchable between a closed posture and an open posture, and the movable arm forms a pass-through path through which a probe cable is insertable and which has a substantially closed contour in a space with the attachment surface in the closed posture, and a part of the contour is interrupted and the pass-through path is opened in the open posture.

With such a configuration, it is possible to effectively prevent the probe cable from being detached from the cable hook against the user's will or the probe cable from entering the cable hook against the user's will. As a result, it is possible to more appropriately hold the probe cable.

In this case, the cable hook further may have a spring that biases the movable arm in a closing direction.

By providing the spring, the movable arm is closed in most cases. As a result, it is possible to prevent the probe cable from coming out of the pass-through path or the irrelevant probe cable from entering the pass-through path against the user's will.

In addition, the cable hook may further have a fixed body that is fixed to the attachment surface and to which the movable arm is swingably connected, a connecting force between the movable arm and the fixed body may be smaller than a limit strength of the movable arm, and in a case where a force in an opening direction, which is equal to or greater than a predetermined value, is applied to the movable arm, the movable arm may be separated from the fixed body without being destroyed.

By configuring the movable arm to be separable from the fixed body, inconvenience is less likely to occur even in a case where an opening angle of the movable arm is reduced. As a result, it is possible to reduce a size of a hinge mechanism of the movable arm.

In this case, the fixed body or an intermediate member interposed between the fixed body and the movable arm may be fitted into the movable arm, and in a case where the force in the opening direction, which is equal to or greater than the predetermined value, is applied to the movable arm, a part of the movable arm may be elastically deformed to release the fitting, so that the movable arm is separated from the fixed body.

With the above-described structure, the movable arm and the fixed body can be separably connected to each other with a simple structure.

In addition, the movable arm may include a main part extending in a direction substantially parallel to the attachment surface, and a terminal part extending from a terminal of the main part toward the attachment surface.

By forming the movable arm in the above-described shape, a closed pass-through path can be formed by one movable arm. As a result, it is possible to reduce the number of components required for the cable hook.

In addition, a terminal of the movable arm may consist of an elastic material or may be covered with an elastic material.

With the above-described configuration, in a case where the movable arm is forcefully closed, a force of collision between the terminal of the movable arm and the attachment surface can be suppressed. As a result, with the above-described configuration, it is possible to suppress occurrence of noise and to prevent damage to the movable arm.

In addition, in a case where a maximum swing angle of the movable arm in the open posture is denoted by $\theta o$, a longitudinal direction dimension of the movable arm is denoted by La, and a maximum diameter of the probe cable inserted through the pass-through path is denoted by $\Phi$, the cable hook may satisfy a condition of $\Phi \leq La \times \sin \theta o$.

With the above-described configuration, the probe cable can be reliably inserted and pulled out into and from the pass-through path.

In addition, a connection terminal may be provided on a front surface of a body part of the ultrasound diagnostic apparatus, and the attachment surface may be a side surface of the body part.

In a case where the connection terminal is provided on the front surface of the body part, providing the cable hook on the side surface of the body part facilitates handling of the probe cable.

In addition, the movable arm may extend in a front-rear direction and may be disposed such that a rotation axis is located near a front end of the movable arm.

The probe cable is easily pulled toward a front side of the body part. In this case, in a case where the terminal of the movable arm is located on the front side, the movable arm is easily opened, and the probe cable is easily detached from the pass-through path. As described above, in a case where the rotation axis of the movable arm is located at the front end of the movable arm, it is possible to effectively prevent the detachment of the probe cable.

With the ultrasound diagnostic apparatus of the present disclosure, it is possible to more appropriately hold the probe cable.

DESCRIPTION OF THE EMBODIMENTS

Figure 1:
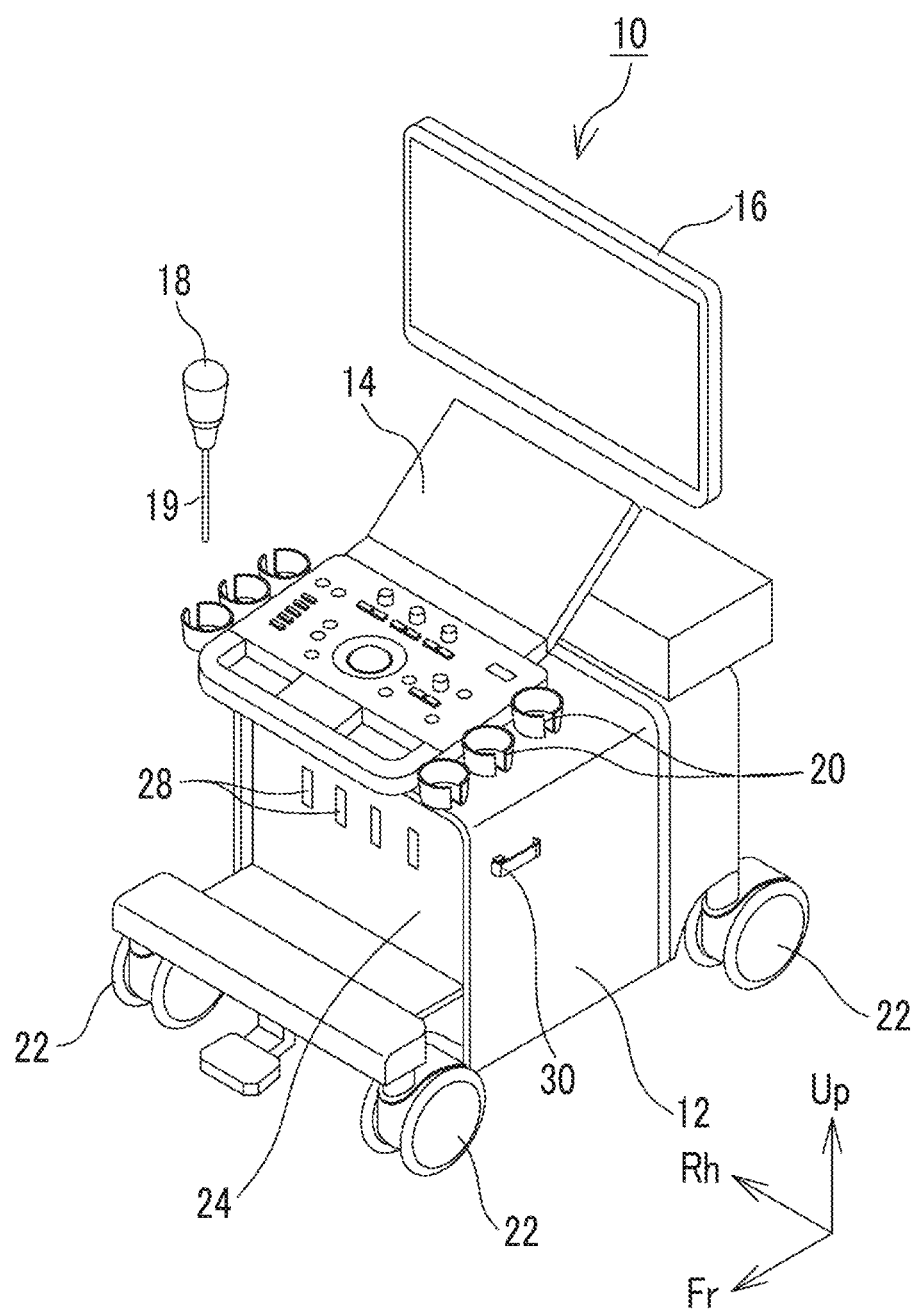
FIG. 1 is a schematic perspective view of an ultrasound diagnostic apparatus.

Hereinafter, a configuration of an ultrasound diagnostic apparatus 10 will be described with reference to the drawings. FIG. 1 is a schematic perspective view of the ultrasound diagnostic apparatus 10. In the following drawings, "Fr", "Up", and "Rh" indicate a front side, an upper side, and a right side of the ultrasound diagnostic apparatus 10, respectively. The ultrasound diagnostic apparatus 10 transmits and receives ultrasonic waves to and from a subject (for example, a living body) and forms an ultrasound image such as a tomographic image based on a reception signal obtained by the transmission and reception of the ultrasonic waves. The ultrasound diagnostic apparatus 10 includes a body part 12, an operation panel 14, and a display 16. The body part 12 is a main part of the ultrasound diagnostic apparatus 10, and serves as a base that supports the operation panel 14 and the display 16. The body part 12 is supported by casters 22, whereby the ultrasound diagnostic apparatus 10 can be easily moved on a floor surface.

An ultrasound probe 18 is connected to the body part 12 via a probe cable 19. A plurality of connection terminals 28 to which a connector (not shown) of the probe cable 19 is connected are provided on a front surface 24 of the body part 12.

The operation panel 14 receives an operation input from a user. The operation panel 14 includes various operation buttons, a trackball, and the like. The display 16 displays the ultrasound image and various types of information. Both the operation panel 14 and the display 16 are attached to a multi-joint arm (not shown). Then, the user can freely change a position and a posture of the operation panel 14 and the display 16 by changing a posture of the multi-joint arm.

The ultrasound diagnostic apparatus 10 is further provided with a plurality of probe holders 20. The probe holder 20 holds the ultrasound probe 18 in a standing posture such that a cable draw-out portion of the ultrasound probe 18 faces downward. Such a probe holder 20 is attached to a periphery of the ultrasound diagnostic apparatus 10. In a case of the example in FIG. 1, a plurality of (three in the illustrated example) the probe holders 20 are attached to each of left and right ends of the operation panel 14.

In a case where the ultrasound diagnosis is performed, the user selects the ultrasound probe 18 suitable for the diagnosis from among the ultrasound probes 18 held by the plurality of probe holders 20, and extracts the selected ultrasound probe 18 from the probe holder 20. Then, the user acquires an ultrasound image by bringing the extracted ultrasound probe 18 into contact with a diagnosis site.

Here, the probe cable 19 has a sufficient length so that the ultrasound probe 18 can be carried to a site distant from the ultrasound diagnostic apparatus 10. Therefore, unless special measures are taken, a part of the probe cable 19 often hangs down to a floor surface. In a case where work related to ultrasound diagnosis is performed while the probe cable 19 hangs down to the floor surface as described above, the probe cable 19 is stepped on by a person, entangled with another probe cable 19, or entangled in the casters 22 of the ultrasound diagnostic apparatus 10. As a result, in a case where the probe cable 19 is left in a state of hanging down to the floor surface, the probe cable 19 may be deteriorated or damaged.

Therefore, in the ultrasound diagnostic apparatus 10 of this example, a cable hook 30 for hooking the probe cable 19 is provided. As shown in FIG. 1, the cable hook 30 is attached to a side surface of the body part 12. Hereinafter, the surface to which the cable hook 30 is attached is referred to as an "attachment surface 26". Although not visible in FIG. 1, one cable hook 30 is attached to each of a right side surface and a left side surface of the body part 12. This is for appropriately holding the probe cable 19 by the cable hook 30 even in a case where the ultrasound probe 18 is held by either the probe holder 20 on the right side or the probe holder 20 on the left side.

Figure 2:
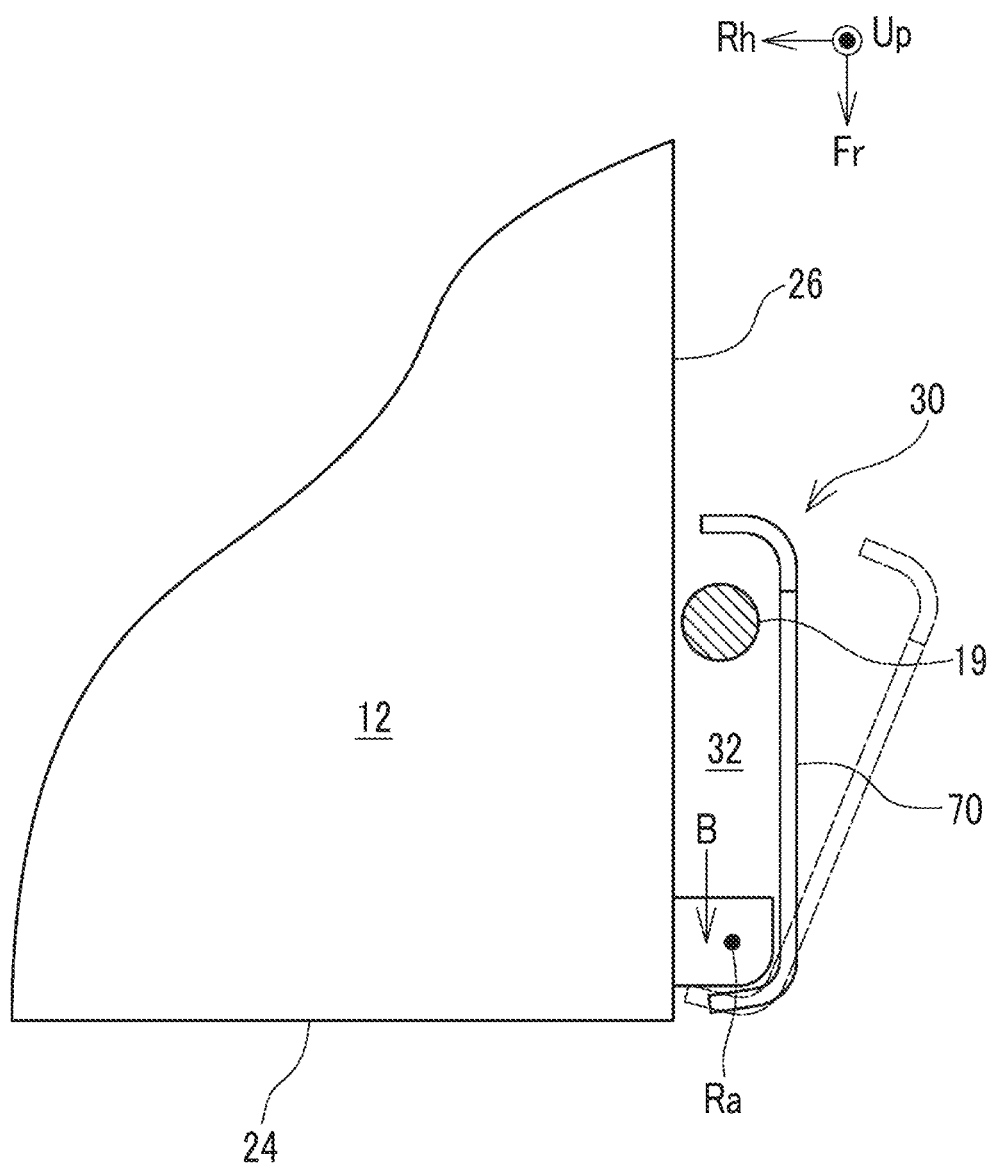
FIG. 2 is a schematic plan view of a periphery of a cable hook.

FIG. 2 is a schematic plan view of a periphery of the cable hook 30. As shown in FIG. 2, the cable hook 30 has a movable arm 70 that is swingable about a predetermined rotation axis Ra. In this example, the rotation axis Ra is located near a front end of the movable arm 70, and is an axis parallel to a vertical direction. In addition, the movable arm 70 is disposed to have a long length in a front-rear direction, and swings in a horizontal plane. The movable arm 70 can be switched between a closed posture and an open posture by swinging, as will be described in detail below. In FIG. 2, the movable arm 70 in the closed posture is shown by a solid line, and the movable arm 70 in the open posture is shown by a two-dot chain line.

The movable arm 70 forms a pass-through path 32, through which the probe cable 19 can be inserted, in a space with the attachment surface 26 in the closed posture. The pass-through path 32 has a substantially closed contour. Here, the term "substantially closed contour" refers to a contour in which the probe cable 19 having the minimum diameter cannot move from the inside to the outside of the contour or from the outside to the inside of the contour.

Therefore, the term "substantially closed contour" includes, in addition to a contour that is completely connected without any notches, a contour in which a notch is present but the notch is less than the minimum diameter.

In the open posture, a part of the contour of the movable arm 70 is interrupted, and the pass-through path 32 is opened. Here, the phrase "pass-through path 32 is opened" means that the notch of the contour is larger than the diameter of the probe cable 19.

The movable arm 70 changes from the closed posture to the open posture by applying a force in a direction away from the attachment surface 26 (hereinafter, referred to as an "opening direction") to the movable arm 70. In addition, the movable arm 70 is biased in a closing direction by a torsion spring 86 described below. Therefore, in a case where the force in the opening direction is released, the movable arm 70 is automatically switched from the open posture to the closed posture.

In a case where the probe cable 19 is held by the cable hook 30, the user temporarily switches the movable arm 70 to the open posture and inserts the probe cable 19 into the pass-through path 32 through the notch of the contour. Thereafter, in a case where a hand is released from the movable arm 70, the movable arm 70 returns to the closed posture. As a result, the probe cable 19 is prevented from being detached from the pass-through path 32.

The probe cable 19 inserted through the pass-through path 32 always takes a detour to pass through the cable hook 30 in a process from the ultrasound probe 18 toward the connection terminal 28. Accordingly, the probe cable 19 is effectively prevented from hanging down to the floor surface.

Figure 3:
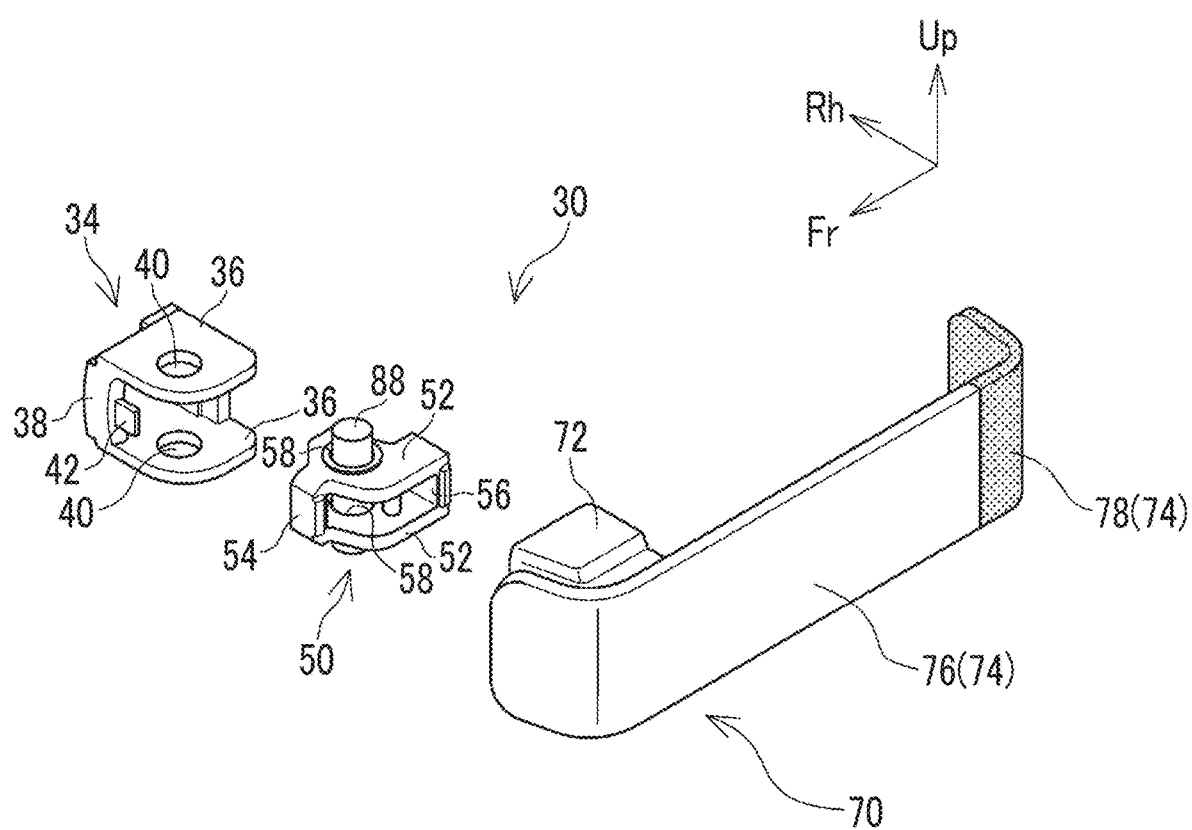
FIG. 3 is an exploded perspective view of the cable hook.
Figure 4:
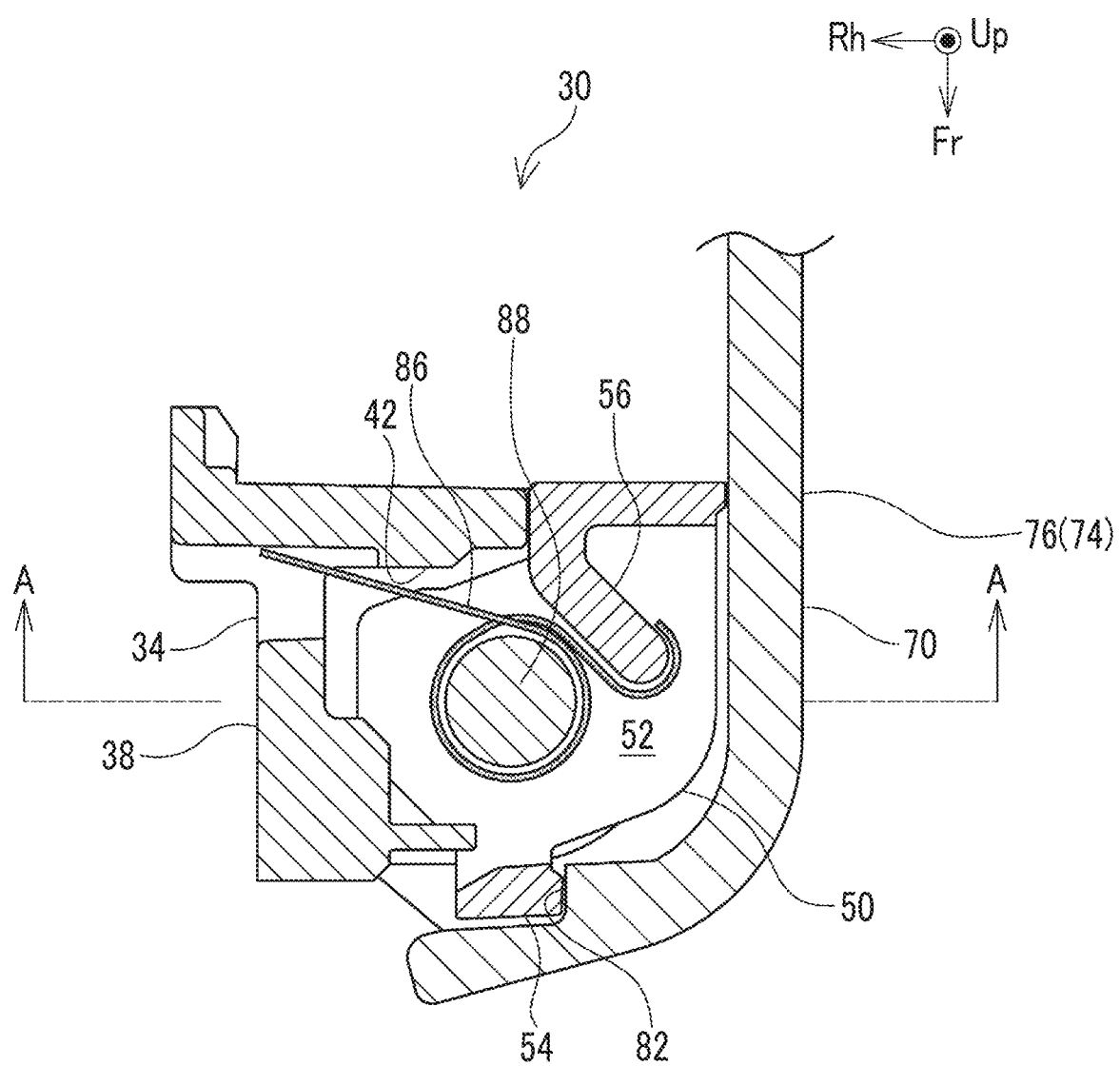
FIG. 4 is a cross-sectional view of the cable hook in a closed posture cut along a plane parallel to a horizontal plane.
Figure 5:
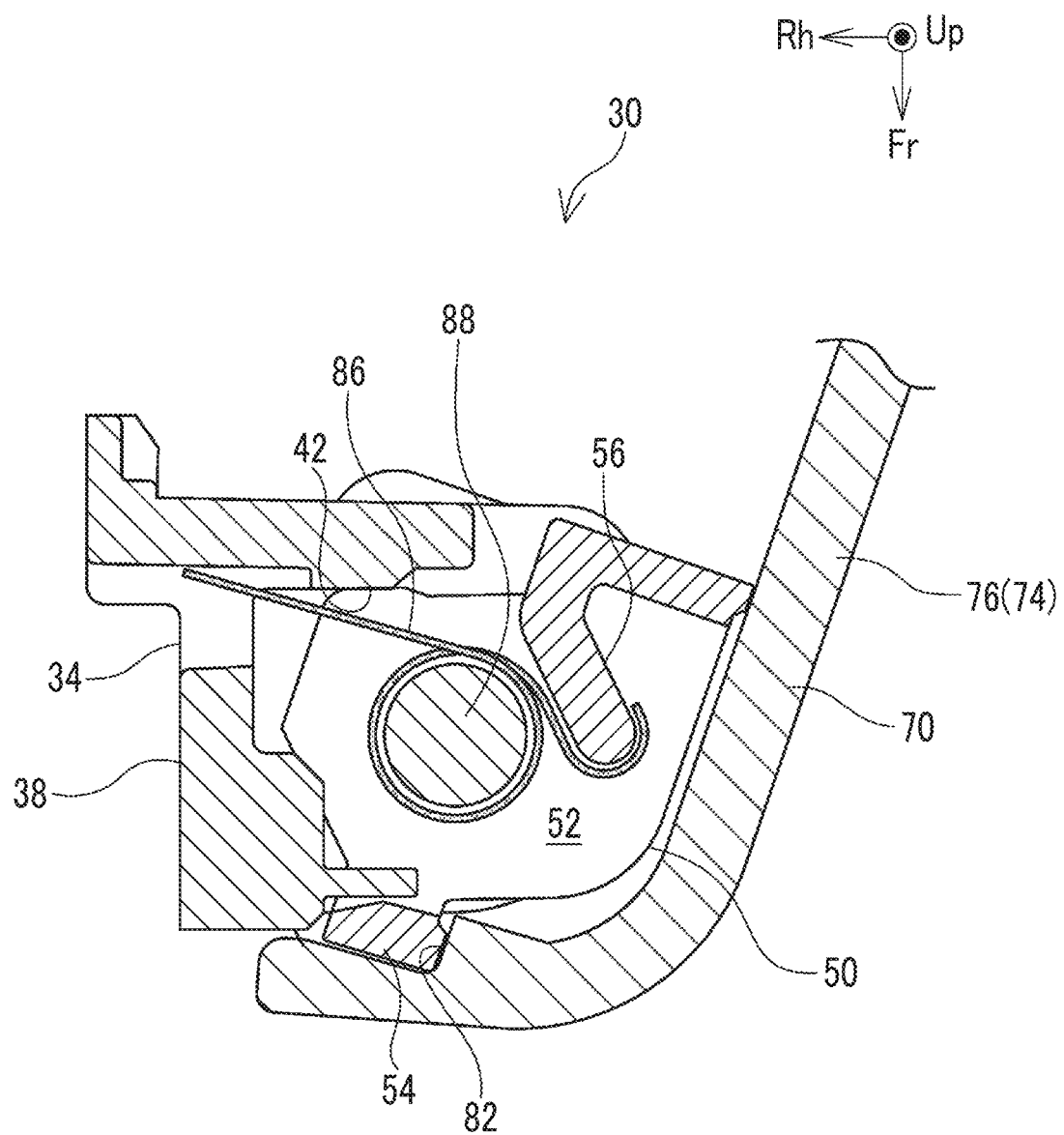
FIG. 5 is a cross-sectional view of the cable hook in an open posture cut along a plane parallel to a horizontal plane.

Next, a specific configuration of the cable hook 30 will be described. FIG. 3 is an exploded perspective view of the cable hook 30. In addition, FIGS. 4 and 5 are cross-sectional views of the cable hook 30 cut along a plane parallel to the horizontal plane.

As shown in FIG. 3, the cable hook 30 has a fixed body 34, a rotating body 50, the movable arm 70, and a hinge shaft 88. The fixed body 34 is a member that is fixed to the attachment surface 26. The fixed body 34 includes a pair of bases 36 facing each other in an up-down direction, and a connecting wall 38 that connects the pair of bases 36. Shaft holes 40 through which the hinge shaft 88 passes are formed in the pair of bases 36. In addition, a part of the connecting wall 38 functions as a stopper surface 42 that abuts on a part of the rotating body 50 to restrict a rotation range of the rotating body 50 (see FIGS. 4 and 5).

The rotating body 50 is disposed between the pair of bases 36 of the fixed body 34, and is a member that is rotatable with respect to the fixed body 34. The rotating body 50 includes a pair of bases 52 facing each other in the up-down direction, an abutment wall 54, and a locking wall 56. Shaft holes 58 through which the hinge shaft 88 passes are formed in the pair of bases 52.

The abutment wall 54 is a wall that connects front ends of the pair of bases 52 to each other. As shown in FIG. 4, the abutment wall 54 is located in an abutment recess 82, which will be described below, of the movable arm 70. In a case where wall surfaces of the abutment wall 54 and the abutment recess 82 abut on each other, the rotating body 50 and the movable arm 70 integrally rotate. In addition, as shown in FIG. 5, in a case where the rotating body 50 rotates in the opening direction by a certain degree or more, a part of the rotating body 50 abuts on the stopper surface 42 of the fixed body 34. As a result, the maximum rotation angle of the rotating body 50 and the movable arm 70 is restricted. Hereinafter, the maximum rotation angle of the movable arm 70 is referred to as a "maximum swing angle θo".

In addition, the locking wall 56 is a wall that connects rear ends of the pair of bases 52 to each other. As shown in FIG. 4, the locking wall 56 is bent in a substantially V shape in plan view. One end of the torsion spring 86 is locked to the locking wall 56. The torsion spring 86 is a biasing member that biases the rotating body 50 and the movable arm 70 in the closing direction. The other end of the torsion spring 86 is locked to a part of the fixed body 34. As shown in FIG. 5, in a case where the rotating body 50 and the movable arm 70 are rotated in the opening direction, the torsion spring 86 applies a biasing force in the closing direction to the rotating body 50. With this biasing force, the rotating body 50 and the movable arm 70 automatically return to the closed posture.

The movable arm 70 is roughly divided into a hinge part 72 and an arm part 74. The arm part 74 further includes a main part 76 that extends in a direction parallel to the attachment surface 26, and a terminal part 78 that extends from a terminal of the main part 76 in a direction approaching the attachment surface 26. In other words, the arm part 74 has a substantially L-shape in plan view. By forming the arm part 74 in a substantially L-shape, the pass-through path 32 having a substantially closed contour can be formed by one movable arm 70. In other words, by forming the arm part 74 in a substantially L-shape, it is not necessary to combine a plurality of components to obtain a closed contour, so that the number of components can be reduced.

The terminal part 78 of the arm part 74 is covered with an elastic material (for example, silicon rubber or natural rubber). With such a configuration, in a case where the movable arm 70 is forcefully closed, a force of collision between the terminal part 78 and the attachment surface 26 can be suppressed. As a result, a collision sound in a case of closing the movable arm 70 can be suppressed, and damage to the movable arm 70 can be prevented. It is needless to say that the terminal part 78 may be entirely made of an elastic material rather than being covered with an elastic material. Further, the terminal part 78 may be configured without the elastic material.

Figure 6:
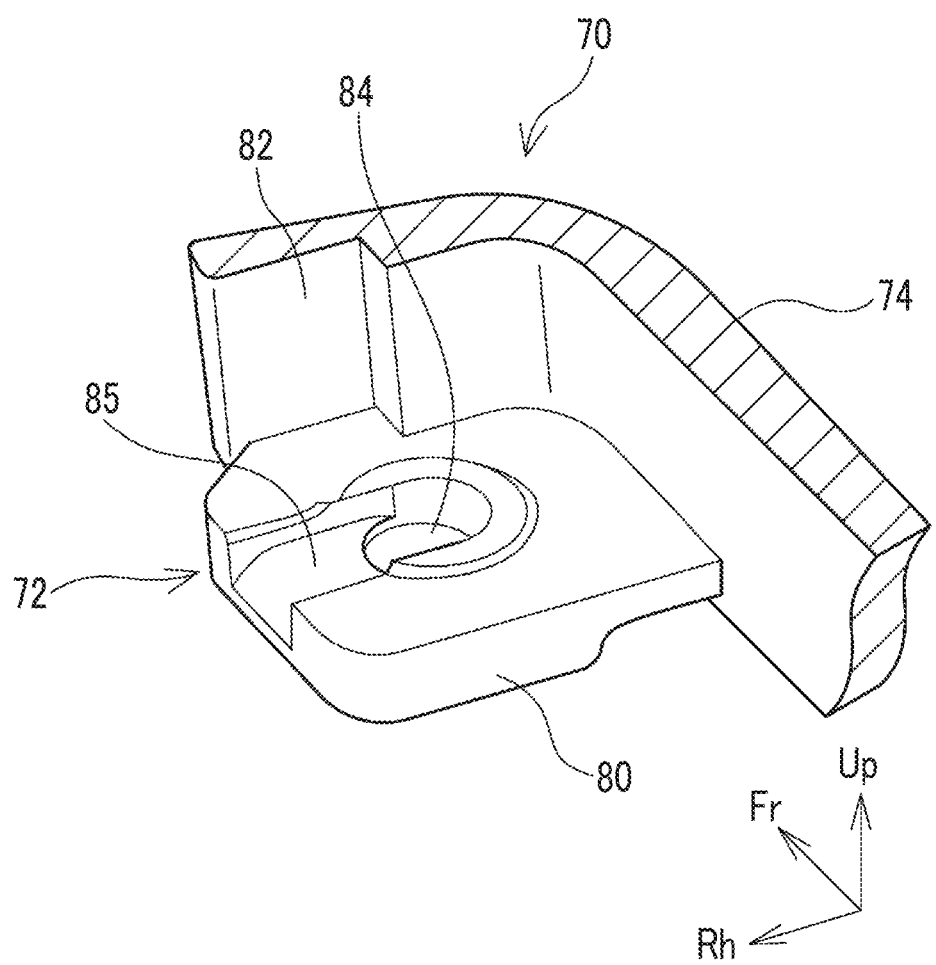
FIG. 6 is a partially cut-away perspective view of a movable arm.
Figure 7:
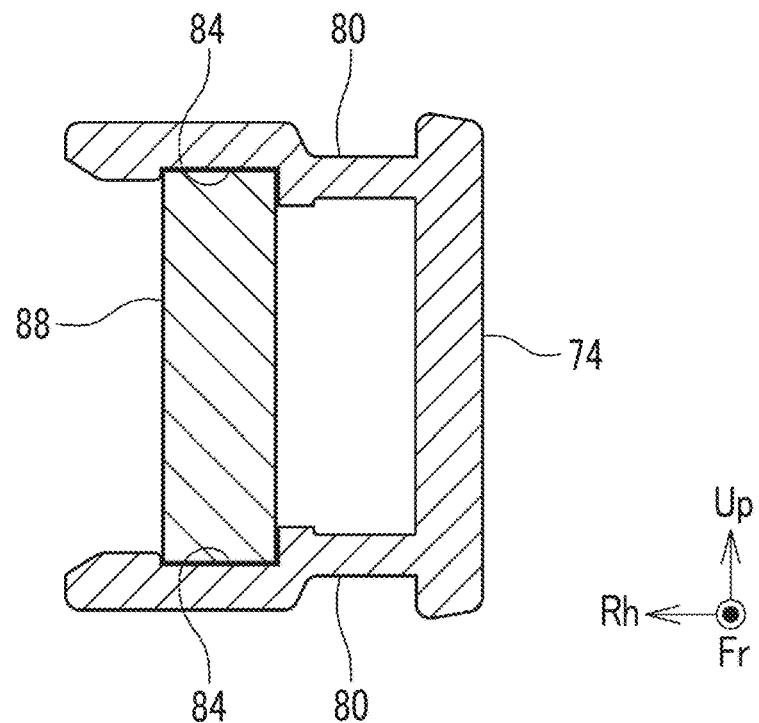
FIG. 7 is a cross-sectional view taken along line A-A in FIG. 4.
Figure 7:
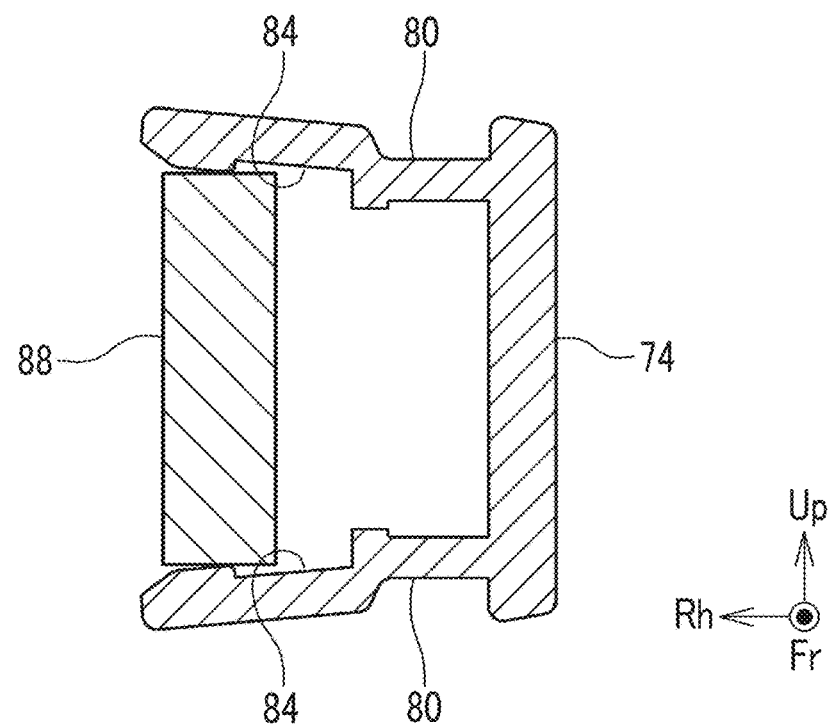

The hinge part 72 is provided at the front end of the movable arm 70. The hinge part 72 is assembled to the fixed body 34 and the rotating body 50 via the hinge shaft 88. The hinge part 72 will be described with reference to FIGS. 4 to 7. FIG. 6 is a partially cut-away perspective view of the movable arm 70. In addition, FIG. 7 is a cross-sectional view taken along the line A-A in FIG. 4. In FIG. 7, only the movable arm 70 and the hinge shaft 88 are shown, and other components are not shown.

As shown in FIG. 7, the hinge part 72 has a pair of bases 80 facing each other in the up-down direction. The pair of bases 80 are connected by the arm part 74. The fixed body 34 and the rotating body 50 are disposed between the pair of bases 80. In addition, as shown in FIGS. 6 and 7, a shaft recess 84 into which an end part of the hinge shaft 88 is fitted is formed in the base 80. The rotating body 50, the fixed body 34, and the hinge part 72 of the movable arm 70 are connected via the hinge shaft 88. Therefore, the hinge shaft 88 functions as an intermediate member interposed between the fixed body 34 and the movable arm 70.

Here, the movable arm 70 is connected to the fixed body 34 via the hinge shaft 88. A connecting force between the movable arm 70 and the fixed body 34 is smaller than a limit strength of the movable arm 70. Therefore, in a case where a force in the opening direction, which is equal to or greater than a predetermined value, is applied to the movable arm 70, the movable arm 70 is separated from the fixed body 34 without being destroyed.

Specifically, as shown in FIG. 7, the hinge shaft 88 is interposed between the pair of bases 80. In other words, the hinge shaft 88, which is the intermediate member, is fitted into the movable arm 70. In addition, the base 80 is a cantilever-shaped portion of which only one end is connected to the arm part 74. In a case where the movable arm 70 is strongly pulled in the opening direction, the pair of bases 80 is bent in a direction in which a distance between the pair of bases 80 increases. As a result, the hinge shaft 88 comes out of the shaft recess 84, and the movable arm 70 is separated from the fixed body 34.

As shown in FIG. 6, an auxiliary groove 85 that extends from a peripheral edge of the shaft recess 84 in a direction approaching the attachment surface 26 is formed in the base 80. By forming the auxiliary groove 85, a depth of a portion of the shaft recess 84 that is close to the attachment surface 26 is shallower than a depth of a portion on the opposite side. As a result, the hinge shaft 88 can more easily come out of the shaft recess 84.

The reason for making the movable arm 70 separable from the fixed body 34 in this manner is as follows. In a case where the maximum swing angle θo of the movable arm 70 is excessively increased, the size of the hinge mechanism is likely to be increased. Therefore, the maximum swing angle θo is suppressed to be small. However, in a case where the maximum swing angle θo is small, a large force is applied to the movable arm 70 in a case where the user strongly pulls the movable arm 70, and thus the movable arm 70 may be easily damaged. Here, in a case where the movable arm 70 is separable from the fixed body 34 as in this example, even in a case where the user strongly pulls the movable arm 70, the movable arm 70 is separated from the fixed body 34 without being destroyed. As a result, even in a case where the maximum swing angle θo is made small, the destruction of the movable arm 70 is effectively prevented. Therefore, in this example, the movable arm 70 is separable from the fixed body 34.

Figure 8:
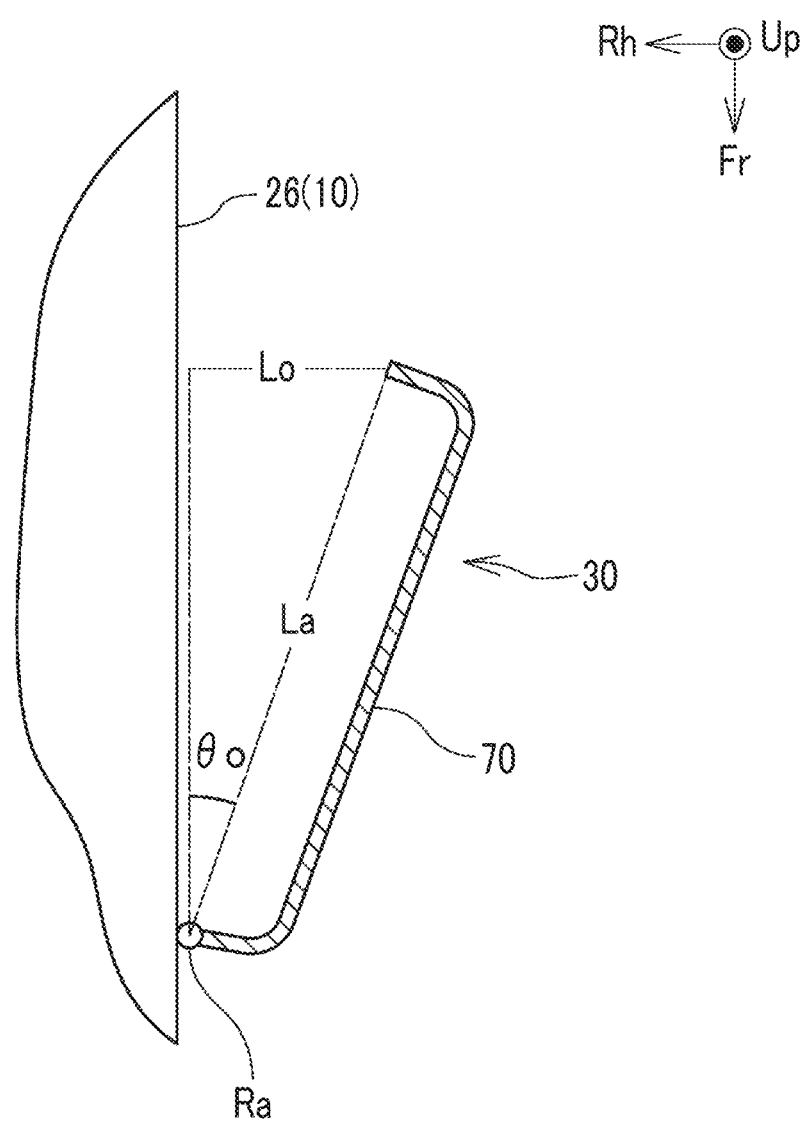
FIG. 8 is a schematic view of the movable arm.

Next, a condition of the dimension of the movable arm 70 will be described with reference to FIG. 8. FIG. 8 is a schematic view of the movable arm 70. In order to insert the probe cable 19 into the pass-through path 32, an opening width Lo in a case where the movable arm 70 is opened up to the maximum swing angle θo has to be equal to or greater than the maximum diameter $\Phi$ of the probe cable 19. Here, in a case where the major axis direction dimension of the movable arm 70 is denoted by La, the opening width Lo is Lo=La×sin(θo). Therefore, the major axis direction dimension La and the maximum swing angle θo of the movable arm 70 are set to values satisfying La×sin(θo)≥$\Phi$.

Incidentally, as is clear from the above description, the cable hook 30 of this example maintains a substantially closed contour as long as a force in the opening direction is not received. As a result, the probe cable 19 inserted through the pass-through path 32 is effectively prevented from being detached to the outside of the pass-through path 32 against the user's will. As a result, with the cable hook 30 of this example, the probe cable 19 can be more appropriately held.

In addition, as is clear from the description so far, in this example, the cable hook 30 is attached to the side surface of the body part 12. With such a configuration, the probe cable 19 is easily handled. That is, in this example, the probe holder 20 is provided at left and right end parts of the operation panel 14, and the connection terminal 28 is provided on the front surface 24 of the body part 12. In this case, the probe cable 19 passes near the side surface of the body part 12 in a process from the probe holder 20 to the connection terminal 28. By attaching the cable hook 30 to this side surface, the probe cable 19 can be easily handled up to the cable hook 30.

Further, in this example, the movable arm 70 is disposed in a posture parallel to the front-rear direction, and the hinge part 72 (by extension, the rotation axis Ra) is disposed near the front end of the movable arm 70. With such a disposition, it is possible to effectively prevent the probe cable 19 from being detached from the cable hook 30 against the user's will. That is, in a case where the user uses the ultrasound probe 18, the ultrasound probe 18 and, by extension, the probe cable 19, are often pulled forward. In this case, the probe cable 19 in the pass-through path 32 presses the front end of the movable arm 70 forward, that is, in a direction of an arrow B in FIG. 2. In a case where the hinge part 72 is provided at a rear end of the movable arm 70, the movable arm 70 may swing and be opened in response to such a pressing force. In this case, the probe cable 19 is detached from the cable hook 30 against the user's will. On the other hand, in a case where the hinge part 72 is provided at the front end of the movable arm 70 as in this example, the movable arm 70 does not swing even in a case where the pressing force is received in the forward direction, so that the probe cable 19 is not detached from the cable hook 30. As a result, according to this example, the probe cable 19 can be stably held by the cable hook 30.

Figure 9:
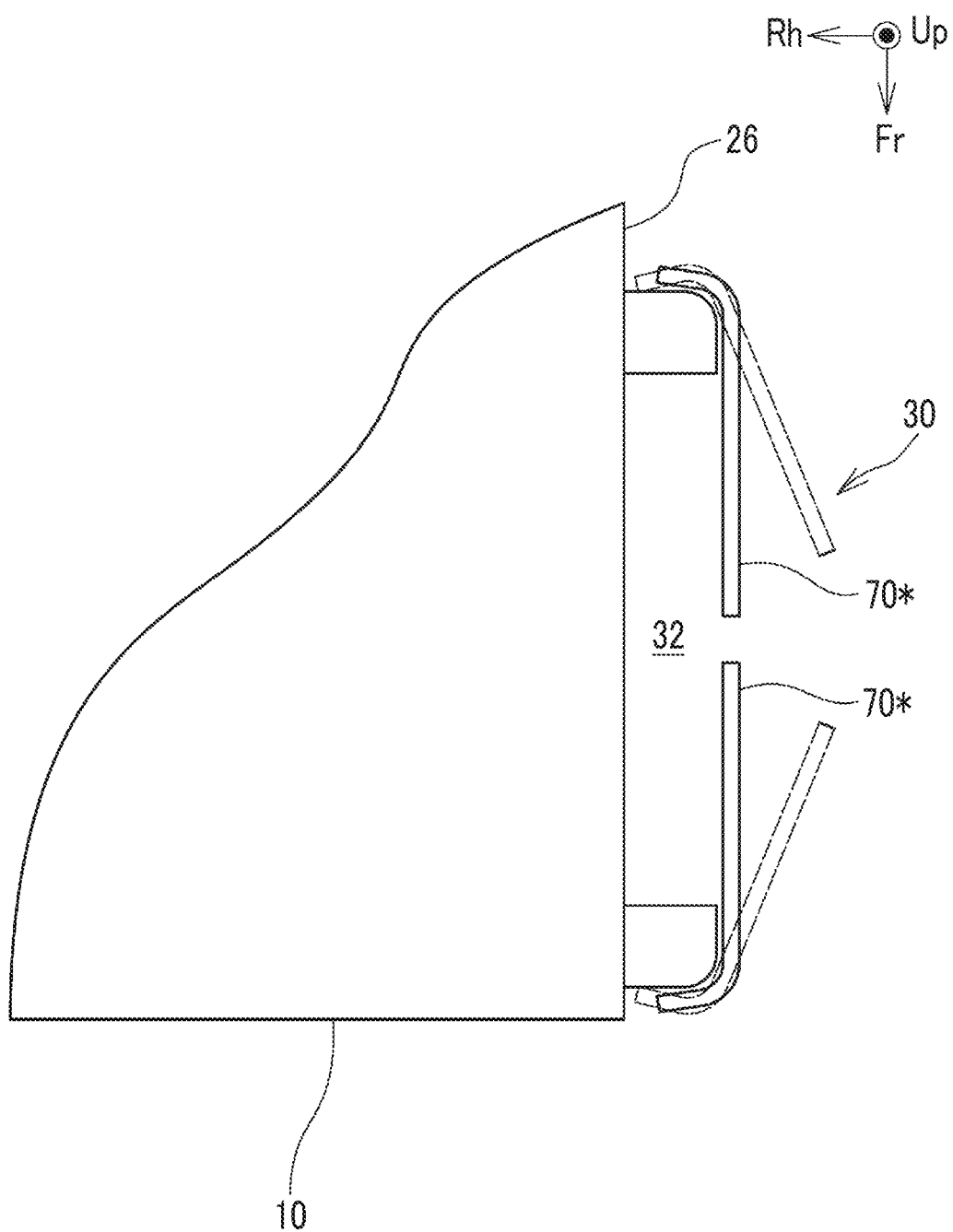
FIG. 9 is a diagram showing another example of the cable hook.

The configuration described so far is an example, and the other configurations may be appropriately changed as long as the ultrasound diagnostic apparatus 10 has the configuration according to claim 1. For example, in the above description, the pass-through path 32 is formed by one movable arm 70, but the pass-through path 32 may be formed by combining a plurality of arms. For example, as shown in FIG. 9, two movable arms 70* may be disposed line-symmetrically, and the two movable arms 70* may form the pass-through path 32.

In addition, the disposition and the posture of the cable hook 30 may also be changed as appropriate. For example, the cable hook 30 may be disposed in a posture in which the hinge part 72 is located at the rear end of the movable arm 70. With such a configuration, in a case where the probe cable 19 is strongly pulled forward, the movable arm 70 is easily opened. As a result, it is possible to prevent an excessive force from being applied to the probe cable 19, thereby preventing damage to the probe cable 19. In addition, as another aspect, the movable arm 70 may be disposed by being inclined with respect to the horizontal direction such that the front end of the movable arm 70 is located on the lower side in the direction of gravitational force with respect to the rear end. With such a configuration, the probe cable 19 hooked to the movable arm 70 slides along the movable arm 70 due to the gravity, and is likely to be collected on the front side and, by extension, on the rotation axis Ra side. As a result, the movable arm 70 is more effectively prevented from being opened against the user's will, and, furthermore, the probe cable 19 is more effectively prevented from being detached against user's will.

Further, the cable hook 30 may be attached to a location other than the side surface of the body part 12 as long as it is located on the outer surface of the ultrasound diagnostic apparatus 10. For example, the cable hook 30 may be attached to the front surface 24 of the body part 12, a peripheral edge of the operation panel 14, or the like. In addition, in a case where a surface (for example, the side surface or the upper surface of the body part 12) that is stationary with respect to the connection terminal 28 is selected as the attachment surface 26 to which the cable hook 30 is attached, the entanglement of the probe cable 19 can be more effectively prevented.

What is claimed is:

1. An ultrasound diagnostic apparatus comprising:
   an attachment surface which is an outer surface of the ultrasound diagnostic apparatus; and
   a cable hook attached to the attachment surface,
   wherein the cable hook has a movable arm configured to be switchable between a closed posture and an open posture, and
   the movable arm forms a pass-through path through which a probe cable is insertable and which has a substantially closed contour in a space with the attachment surface in the closed posture, and a part of the contour is interrupted and the pass-through path is opened in the open posture,
   wherein the cable hook further has a fixed body that is fixed to the attachment surface and to which the movable arm is swingably connected,
   a connecting force between the movable arm and the fixed body is smaller than a limit strength of the movable arm, and
   in a case where a force in an opening direction, which is equal to or greater than a predetermined value, is applied to the movable arm, the movable arm is separated from the fixed body without being destroyed.

2. The ultrasound diagnostic apparatus according to claim 1,
   wherein the cable hook further has a spring that biases the movable arm in a closing direction.

3. The ultrasound diagnostic apparatus according to claim 1,
   wherein the fixed body or an intermediate member interposed between the fixed body and the movable arm is fitted into the movable arm, and
   in a case where the force in the opening direction, which is equal to or greater than the predetermined value, is applied to the movable arm, a part of the movable arm is elastically deformed to release the fitting, so that the movable arm is separated from the fixed body.

4. The ultrasound diagnostic apparatus according to claim 1,
   wherein the movable arm includes a main part extending in a direction substantially parallel to the attachment surface, and a terminal part extending from a terminal of the main part toward the attachment surface.

5. The ultrasound diagnostic apparatus according to claim 2,
   wherein a terminal of the movable arm consists of an elastic material or is covered with an elastic material.

6. The ultrasound diagnostic apparatus according to claim 1,
   wherein, in a case where a maximum swing angle of the movable arm in the open posture is denoted by $\theta o$, a longitudinal direction dimension of the movable arm is denoted by $La$, and a maximum diameter of the probe cable inserted through the pass-through path is denoted by $\Phi$, the cable hook satisfies a condition of $La \times \sin \theta o \geq \Phi$.

7. The ultrasound diagnostic apparatus according to claim 1,
   wherein a connection terminal is provided on a front surface of a body part of the ultrasound diagnostic apparatus, and
   the attachment surface is a side surface of the body part.

8. The ultrasound diagnostic apparatus according to claim 7,
   wherein the movable arm extends in a front-rear direction and is disposed such that a rotation axis is located near a front end of the movable arm.

* * * * *